March 2, 1948. H. HATTEN 2,437,025
MACHINE FOR CUTTING HOLES IN PIPES AND SIMILAR ARTICLES
Filed March 21, 1945 3 Sheets-Sheet 1
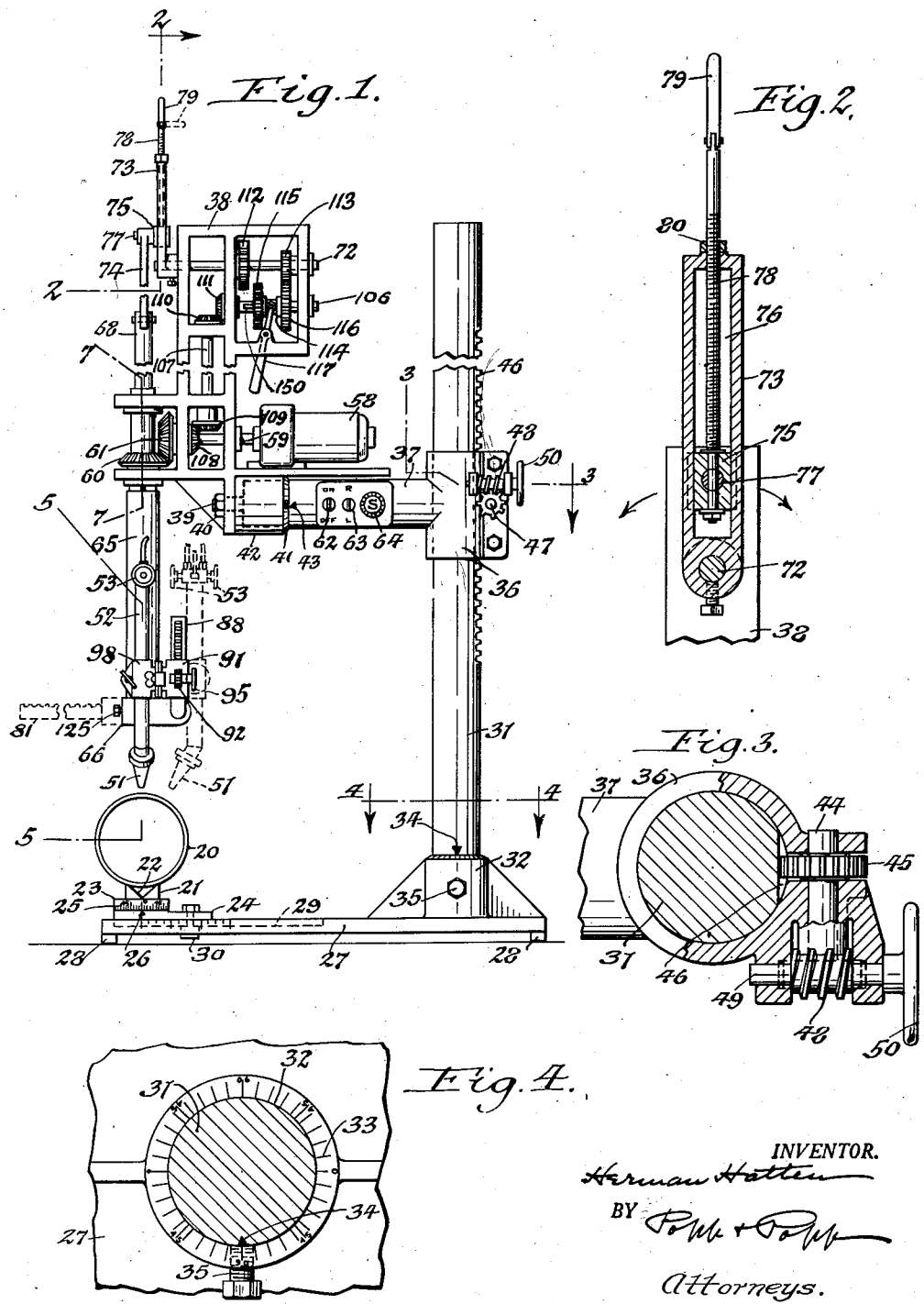
INVENTOR.
Herman Hatten
BY
Attorneys.

March 2, 1948.         H. HATTEN         2,437,025
MACHINE FOR CUTTING HOLES IN PIPES AND SIMILAR ARTICLES
Filed March 21, 1945         3 Sheets-Sheet 2
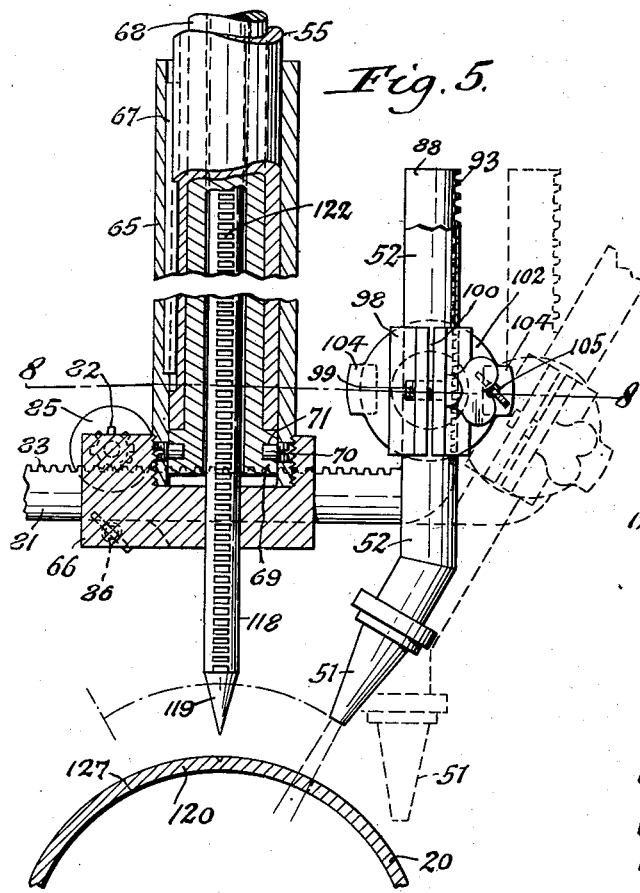
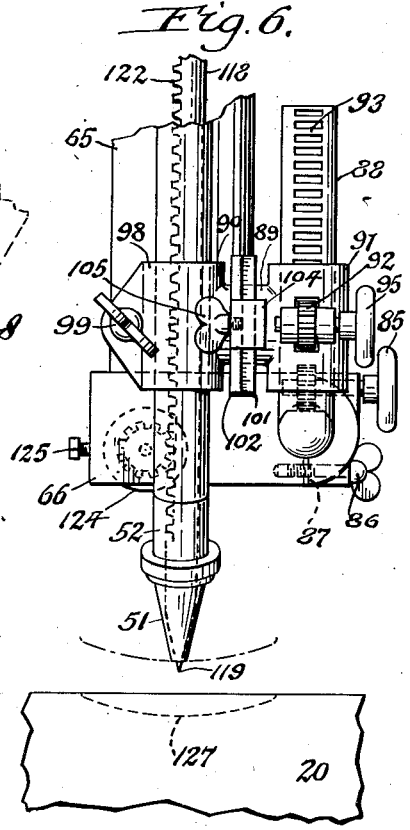
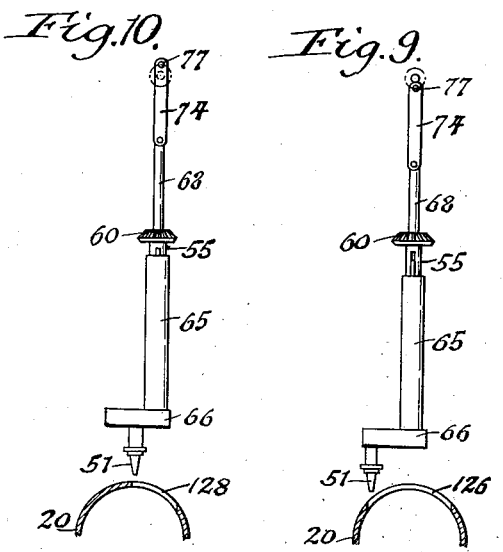
INVENTOR.
Herman Hatten
BY
Attorneys.

March 2, 1948.  H. HATTEN  2,437,025
MACHINE FOR CUTTING HOLES IN PIPES AND SIMILAR ARTICLES
Filed March 21, 1945  3 Sheets-Sheet 3
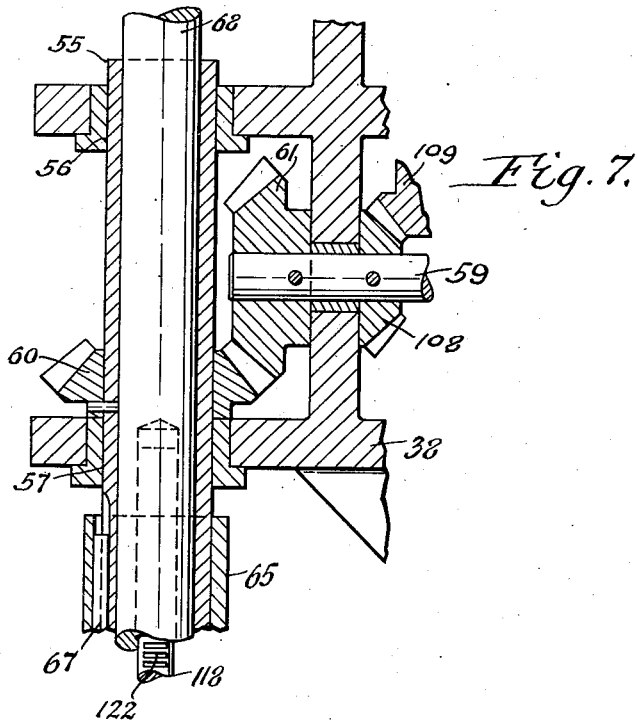
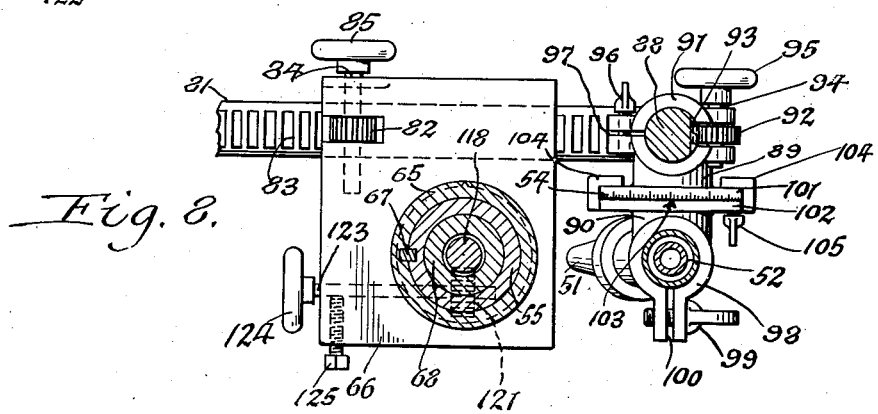
INVENTOR.
Herman Hatten;
BY
Attorneys.

Patented Mar. 2, 1948

2,437,025

UNITED STATES PATENT OFFICE 2,437,025

MACHINE FOR CUTTING HOLES IN PIPES AND SIMILAR ARTICLES

Herman Hatten, Buffalo, N. Y.

Application March 21, 1945, Serial No. 584,006

5 Claims. (Cl. 33—21)

This invention relates to a machine for cutting holes in pipes and similar articles by means of a flame of gas which is directed toward the surface to be cut by means of the tubular nozzle or burner of a torch which is supplied with a combustible gaseous agent of the desired character and is moved in a circular path and also toward and from said article in accordance with the size of the hole which is to be cut.

It is the object of this invention to provide a machine of this character which can be readily adapted for cutting holes of different diameter in the pipe or article so that the edges of the holes are either straight or beveled and the center of these holes may also be arranged radially relative to the axis of the pipe or tangentially relative thereto and this machine is also so organized that the same can be easily operated and produce work of this character uniformly, economically, accurately and expeditiously.

In the accompanying drawings:

Fig. 1 is a side elevation, on a reduced scale, of the machine embodying this invention.

Fig. 2 is a vertical section, on an enlarged scale, taken on line 2—2, Fig. 1.

Figs. 3 and 4 are horizontal sections, on a still larger scale, taken on the correspondingly numbered lines in Fig. 1.

Fig. 5 is a fragmentary vertical section, on an enlarged scale, of the lower part of the means whereby the gas burning torch is adjustably supported relaitve to the pipe which is to be cut, this section being taken on line 5—5, Fig. 1.

Fig. 6 is an elevational view of the parts shown in Fig. 5 and viewed at right angles thereto.

Fig. 7 is a fragmentary vertical section, on an enlarged scale, taken on line 7—7, Fig. 1 and showing part of the gearing for transmitting motion from the source of power to the means which support the torch.

Fig. 8 is a horizontal section taken on line 8—8, Fig. 5.

Figs. 9 and 10 are fragmentary diagrammatic views indicating the manner in which this machine is used for cutting holes so that the center of the same is in different positions with reference to the axis of the tube.

In the following description, similar characters of reference indicate like parts in the several figures of the drawings:

The numeral 20 represents the workpiece having the form of a pipe into the side of which a hole is to be cut by means of the torch which is mounted and operated by means of the machine which embodies this invention. This pipe may be of any material, for example metal, and the same may be supported in position for operation thereon by the gas torch in any suitable manner, the means for this purpose shown in the drawings being satisfactory and consisting generally of a block 21 which is provided on its upper side with a V-shaped seat 22 upon which the pipe is adapted to rest with its underside while a hole is being cut by the torch flame in the upper part thereof. This block is arranged on the upper side of a rotatable disk 23 which is mounted on the upper side of a carrier 24 so that the supporting block can be turned about a vertical axis and thus present the workpiece or pipe to be cut at various angles while the pipe is in a horizontal position. For convenience in locating this adjustable disk relative to the carrier, this disk may be provided on its peripheral edge with suitable graduations 25 which are moved relatively to a mark 26 on the carrier and thereby facilitate presenting the pipe in the desired position to the cutting device.

The carrier 24 is also capable of transverse adjustment on the upper side of the base 27 of a standard which supports the hole burning torch and the parts for adjusting the same and also the means for locating the torch for cutting a hole in the pipe in the desired position. This base is provided on its underside with feet 28 adapted to rest upon the floor or other surface and the carrier 24 may be adjusted horizontally in a guideway 29 formed on the base and held in position thereon after adjustment, by means of a clamping bolt 30 passing through the carrier and through one part or another of this base.

On one side of the pipe supporting block and associated parts the base of the standard is provided with an upright post or column 31 which is preferably of cylindrical form in cross section and upon this post are mounted the means which support the gas torch and the parts associated therewith. For the purpose of permitting the working parts of the apparatus to be adjusted bodily in a horizontal plane to suit the position of the pipe or the location of the hole which is to be cut therein, means are provided for turning the post 31 about a vertical axis on the base 27, this being preferably accomplished by setting the lower end of the post in a vertical bearing or socket 32 formed on the upper side of the base so that this post can turn about a vertical axis on the base. For convenience in locating the position of the post on the base, the upper edge of the socket is provided with an annular row of calibrations or graduations 33 relative to which a mark 34 on the post may be turned for bringing the latter and the parts carried thereby into the desired position. After this adjustment has been completed the post is secured in place by means of a clamping screw 35 working in a threaded opening in the socket and engaging the side of this post.

The means which support the torch and associated parts comprise a vertically adjustable carriage which includes a sleeve 36 slidable vertically on this post and provided with a horizontally projecting arm 37, and a main frame 38 which is mounted on the carriage so as to be compelled to move vertically with the carriage but is also capable of turning in a vertical plane for the purpose of bringing the torch into different angular positions relative to the pipe which is to be cut. Various means may be employed for connecting the main frame with the carriage such, for example, as a horizontal pivot and clamping bolt 39 passing through the lower part of the main frame and the outer end of the supporting arm 37 and provided with a nut 40 whereby these parts are held against movement relatively to each other after the main frame has been adjusted into the desired position on the carriage. The angular position of the main frame and the parts mounted thereon relative to the vertically movable carriage may be determined by means of an annular graduation or calibration 41 arranged on a lower horizontal tubular part 42 of the main frame which rotates vertically on the arm 37 concentrically with the coupling bolt 39 and permits one part or another of the calibration 41 to be brought in line with a mark 43 on the carriage arm 37, as shown in Fig. 1.

Various means may be employed for raising and lowering the carriage on the standard, those shown in Figs. 1 and 3 being suitable for this purpose and constructed as follows:

The numeral 44 represents a gear shaft journaled in a horizontal bearing on one side of the sleeve 36 and provided with a gear wheel 45 which meshes with a vertical gear rack 46 formed on one side of the post 31. The shaft 44 is also provided with a worm wheel 47 which meshes with a worm 48 mounted on an adjusting shaft 49 which turns in bearings on the sleeve 36 but is held against axial movement by engagement of the opposite ends of this worm with said bearings, as shown in Fig. 3. Rotation of this worm shaft is effected by a hand wheel 50 secured to one end thereof. Upon turning the worm in one direction or the other the carriage 36, 37 and the parts mounted thereon will be either raised or lowered and retained in the adjusted position.

51 represents the tubular nozzle burner or blow pipe of the gas torch whereby the flame of the combustible gas is directed toward the periphery of the pipe for burning a hole in the latter. This nozzle is arranged at an angle on the lower end of an intake pipe 52 which latter can be rotated about its axis and also moved bodily into different angular positions for the purpose of causing the flame to be directed at any desired angle toward the surface of the pipe. If desired other kinds of tools or markers may be employed for cutting holes in articles or producing marks thereon.

The gas for producing the flame at the tip end of the burner may be of the character commonly used for perforating or cutting purposes and conducted from the source of supply to the upper end of this intake pipe 52 of the torch by means of a hose and controlled by valves 53.

Means are provided for supporting the torch on the main frame so that the same may be adjusted into different angular positions about the axis of the intake pipe 52 and also adjusted bodily into different positions relative to the pipe or workpiece which is to be cut, which adjusting means are preferably constructed as follows:

55 represents an upright tubular driven shaft which has its upper part journaled in two bearings 56, 57 formed on the front part of the main frame and capable of turning in these bearings but incapable of moving axially therein.

Rotation of this driven shaft is preferably effected by power from a motor 58 which is mounted on the inner part of the main frame and has a motor shaft 59 journaled in the main frame and operatively connected with the driven shaft by intermeshing bevel gear wheels 60, 61 secured to the upper end of the driven shaft and the outer end of the motor shaft. The motor is preferably operated by an electric current and may be started and stopped by a switch 62, or turned in either direction by operation of a switch 63, or changed as to speed by a switch 64. These switches may be mounted on any suitable part of the machine, for instance, on the arm 37 of the vertically movable carriage, as shown in Fig. 1.

On the lower end of the driven shaft 55 is mounted a supporting turret which preferably comprises an upper tubular body or sleeve 65 which surrounds the lower part of the driven shaft, and a lower head 66 which is secured to the lower end of this sleeve by means of a screw joint or otherwise. This supporting turret is compelled to turn with the driven shaft but is capable of sliding lengthwise thereon by means of a spline 67 interposed between these members, as shown in Fig. 5.

A vertically reciprocating motion is imparted to the supporting turret by the following means which operatively connect the same with the motor 58:

The numeral 68 represents a vertically sliding shifting rod, sleeve or member which is arranged within the driven shaft and provided at its lower end with an enlargement or collar 69 which is arranged between the lower end of the driven shaft and the head 66 of the turret. This shifting rod and the turret may be operatively connected in any suitable manner so as to compel them to move together axially but permit the turret to turn relative to the shifting sleeve, the means for this purpose shown in the drawings consisting of screws 70 secured in the tubular body 65 of the turret and engaging with an annular groove 71 in the adjacent part of the collar of the shifting rod, as shown in Fig. 5.

Raising and lowering of the shifting rod 68 is effected by means which include a horizontal crank shaft 72 journaled in the upper part of the main frame 38 and provided at its front end with a crank 73 and a link 74 pivotally connected at its lower end with the upper end of the shifting rod while its upper end is adjustably connected with this crank for the purpose of varying the length of the throw which is imparted to the shifting rod during each rotary movement of this crank shaft. These adjusting means, as best shown in Figs. 1 and 2, preferably include an adjusting block 75 which is slidable in a radial guideway 76 formed lengthwise on the crank 73 and provided with a wrist pin 77 whereby the same is pivotally connected with the upper end of this link and an adjusting screw 78 mounted lengthwise on this crank and having its intermediate part working in a threaded opening in the outer end of the crank, while its inner end is connected with the adjusting block so that this screw is capable of turning in this block. Rotation of the adjusting screw is effected by a handle 79 pivoted on the outer end of the adjusting screw. Upon turning this screw in one direction or the other, the adjusting block is shifted toward or from the axis of the crank shaft, thereby permitting of varying the distance from the center of the crank shaft to the wrist pin 77 and either lengthening or shortening the longitudinal movement of the turret as required for cutting holes into pipes of different diameters.

When turning the adjusting screw by means of the handle 79 the latter projects laterally from this screw, as shown by dotted lines in Fig. 1, but after the adjusting screw has been turned the requisite extent, this handle is turned upwardly or axially in line with the adjusting screw, as shown by full lines in Figs. 1 and 2, thereby enabling the crank to rotate without liability of this handle interfering with adjacent parts of the apparatus. After the adjustment of the adjusting block 75 has been completed, the adjusting screw is held against rotation by means of a clamping nut 80 applied thereto and engaging with the outer end of the crank, as shown in Fig. 2.

The crank shaft 72 is rotated by means of power driving from the motor 58 and these means include a speed changing device which will cause the crank shaft to make either one complete rotation for each rotation of the motor drive shaft 59 or two complete rotations of the crank shaft for each rotation of the motor shaft and thereby adapt this machine for cutting holes in the side of the pipe, the axis of which is in line with the radius of the pipe or one in which the axis of the opening is on one side of a radial line of the pipe.

Means are provided for adjustably connecting the cutting torch with the supporting turret in order to adapt the position of this torch for cutting an opening of the desired size in the pipe and also cutting the edge of the opening of the desired character, which adjusting means are constructed as follows:

The numeral 81 represents the horizontal adjusting rod of a sweep which is slidable horizontally and transversely in the head 66 of the supporting turret, which movement is preferably effected by means of the gear pinion 82 engaging with a gear rack 83 on the upper side of this rod, an adjusting shaft 84 journaled in this head and connected with the adjusting pinion 82 and a hand wheel 85 secured to the outer end of the adjusting shaft and adapted to be turned manually. Upon turning this gear pinion 82 in one direction or the other the adjusting rod 81 is moved lengthwise and after such adjustment this rod is held against further movement by clamping means which preferably consist of a screw 86 which connects the parts of the head which are formed on opposite sides of a slit 87 leading from the face of the guideway in which the rod 81 slides to the exterior of this head, as shown in Figs. 5 and 6. When this screw is loose the grip on the shifting rod 81 is released but when this screw is tightened this rod is gripped and held against longitudinal movement.

At its rear end the horizontal shifting rod 81 is provided with an upright extension rod 88 which forms part of the sweep and upon which the cutting torch is adjustably mounted. The preferred means for this purpose include a swivel joint or coupling which comprises two body sections 89, 90 which are rotatable relatively to each other about a horizontal axis and the inner one 89 of which is adjustable vertically on the rod extension 88 while the other outer body section 90 is connected with the intake tube of the cutting torch so that the latter can be raised and lowered and also turned about a vertical axis. The preferred means for adjustably connecting the inner body section of the swivel joint with the upright extension rod 88, as shown in Figs. 1, 5, 6 and 8, include an adjusting sleeve 91 arranged on the outer side of the swivel body section 89 and mounted on this upright extension rod, a gear pinion 92 meshing with an upright gear rack 93 on the extension rod, an adjusting shaft 94 journaled in bearings on this sleeve 91 and provided with an operating hand wheel 95, whereby upon turning the latter the swivel joint and the parts connected therewith will be raised or lowered on the extension rod. After this adjustment has been completed the parts are held in position by means of a clamping screw 96 which connects the parts of the sleeve 91 on opposite sides of a slit 97 therein, as shown in Fig. 8.

The outer swivel body section 90 is provided with a sliding clamping sleeve 98 which embraces the inlet tube 52 of the torch and in which this inlet tube can be moved lengthwise of its axis and also turned about this axis for bringing the torch into the desired position, after which the torch is held in place by means of a clamping screw 99 which connects the parts of the sleeve which are formed on opposite sides of a slit 100 extending from the bore of this sleeve to the exterior thereof, as shown in Figs. 5 and 8.

The opposing ends of the swivel body sections are provided with swivel disks 101, 102 which engage with each other and are adapted to be turned relative to each other about a horizontal axis for bringing the torch into the desired angular position relative to the pipe which is to be cut. The relative position of these two swivel disks can be determined by means of a mark 103 on the periphery of one of these disks adapted to traverse a graduation or calibration 54 on the periphery of the other swivel disk, as shown in Figs. 6 and 8. These two swivel disks are held in engagement with each other by means of retaining fingers 104, formed on one of these disks and overhanging the outer side of the other disk, as best shown in Figs. 5, 6 and 8 and the same are held against turning relatively to each other when the parts are in their proper position by means of a clamping screw 105 working in a threaded opening in one of these disks and bearing against the opposing surface of the other swivel disk.

Although various means may be employed for varying the relative speed of the driven shaft 55 and the crank shaft 72, those shown in Fig. 1 as an example, are satisfactory, and are constructed as follows:

106 represents a countershaft which is arranged parallel with the crank shaft 72 and journaled adjacent thereto on the main frame 38 in suitable bearings. This countershaft is rotated from the motor shaft 59 by means of an upright intermediate shaft 107 which is journaled in bearings on the main frame and operatively connected at its lower end by means of a pair of intermeshing bevel or miter gear wheels 108, 109 secured respectively to the motor shaft and the intermediate shaft and a pair of intermeshing miter or bevel gear wheels 110, 111 secured respectively to the upper end of the intermediate shaft 107 and the adjacent end of the countershaft 106.

The numerals 112, 113 represent two driven gear wheels secured to the crank shaft, one of these 112 being of large diameter and the other 113 of small diameter. On the countershaft is mounted a clutch sleeve 114 by means of a spline 150 which compels this clutch sleeve to turn with the countershaft but permits this sleeve to slide on this shaft. At one end this clutch sleeve is provided with a relatively small sliding gear wheel 115 adapted to be moved into and out of mesh with the large gear 112 on the crank shaft and at its opposite end this clutch sleeve is provided with a relatively large sliding gear wheel 116 which is adapted to be moved into and out of mesh with the small gear 113 on the crank shaft. Longitudinal movement of the clutch sleeve and the gear connected therewith is effected by means of a shifting lever 117 which is pivoted on the main frame and has its inner arm operatively connected with the clutch sleeve while its outer arm is adapted to be manually manipulated. Upon shifting the sliding gears 115, 116 so that both of them are out of mesh with their respective companion gears 112, 113 then no motion will be transmitted from the countershaft to the crank shaft, but when the sliding gears are shifted so that the large sliding gear 116 meshes with the small countershaft gear 113 the crank shaft will be turned twice during every revolution of the countershaft, as shown in Fig. 1, and when the large sliding gear 116 is out of engagement from its companion small countershaft gear 113, and the small countershaft gear 115 meshes with the large crank shaft gear 112 of the same size, then both the countershaft and the crank shaft will rotate at the same speed.

Means are provided for properly locating this cutting apparatus relative to the pipe or workpiece so that the torch upon being rotated will produce a hole in the pipe in the desired location. For this purpose locating means are provided which are preferably constructed as follows:

The numeral 118 represents a locating or centering pin which is arranged within the hollow shifting tube 68 and extends downwardly through a guide opening in the turret head 66. This locating pin is provided at its lower end with a point 119 which is adapted to temporarily engage with the periphery of the pipe 20 which is to be cut and form a pilot center about which the cutting torch is to be rotated during the operation of cutting out a section of the pipe for producing a hole therein. After the apparatus has been thus properly located with reference to the pipe this locating pin is raised in the shifting sleeve and turret a sufficient distance to retract its lower pointed end from the periphery of the pipe while the latter is being cut. The longitudinal movement of this locating pin is preferably effected by means which include a gear pinion 121 meshing with a gear rack 122 on one side of the locating pin, an adjusting shaft 123 journaled horizontally in the turret head and connected with the shifting pinion 122 and provided at its outer end with a hand wheel 124 for manipulating the same and means for holding the locating pin either in its operative or in its inoperative position, such for example, as a set screw 125 which works in a threaded opening in the turret head and engages the adjusting shaft 123, as best shown in Figs. 6 and 8.

In the position of the parts of this machine, as shown in Figs. 1-9, the same are set for cutting a hole in the side of a pipe, the axis of which opening is arranged on a radial line from the axis of the pipe which is to be cut, the operation of setting the machine in preparation for making such a cut and subsequently performing this cutting operation being as follows:

While the machine is at rest and the turret together with the parts mounted thereon are elevated, the pipe 20 to be cut is placed horizontally upon the V-shaped seat 22 of the supporting block where it is held by gravity inasmuch as the weight of the pipe is sufficient for this purpose but, if necessary, additional means may be provided for holding the pipe into position preparatory to cutting a hole in the same.

The horizontal sweep rod 81 is now adjusted horizontally on the head 66 of the turret, the intake tube 52 of the gas supply line is adjusted vertically in the sleeve 98, the two body sections 89, 90 of the swiveling coupling are rotated one relative to the other and the adjusting sleeve 91 is moved vertically on the sweep rod extension 88 for the purpose of bringing the tip or outlet end of the burner nozzle 51 in the proper position for directing the gas flame against the upper part of the pipe.

Preparatory to lowering the turret, the locating pin 118 is lowered and its pointed lower end 119 is engaged with a spot on the top of the pipe or workpiece for the purpose of definitely locating the place on the pipe about which the burner must rotate for cutting the hole in the desired place in the pipe by means of the gas flame. After the burner has been thus located relative to the pipe to be cut, the locating pin 118 is elevated into its inoperative position.

After the parts have been thus adjusted and properly located for cutting a hole of the desired size in the pipe, the gas controlling valves 53 are opened and the gas issuing therefrom is ignited and the motor 58 is started so as to impart a bodily rotary movement of the torch about the axis of the driven shaft 55 and at the same time the turret is moved lengthwise of this shaft.

When cutting a hole 126 in a pipe, the center of which is coaxial with a radial line of the pipe, it is necessary for the burner or torch, in order to produce a uniform kerf 127 to remain the same distance from the surface of the pipe during the entire circular movement around this axis and for this reason the burner during each cycle of operations moves from a position immediately above the highest part of the pipe downwardly in a quarter circle and upwardly another quarter circle on one side of the longitudinal axis of the pipe, thence downwardly a quarter circle and upwardly another quarter circle on the opposite side of this longitudinal center of the pipe so as to complete the circular cut in the pipe which will remove the disk 120 from the pipe and leave the completed hole therein.

When cutting a hole of this character in the top of the pipe, the crank 73 projects upwardly from the crank shaft 72 when the tip of the burner is above the highest part of the pipe and during the following complete rotation of this crank in which it moves downwardly and upwardly to its place of beginning, the burner is likewise moved downwardly and upwardly 180° or half of a complete circle so as to cut one half of the hole in the top of the pipe on one side of its longitudinal center and during the next complete turn of the crank from its upwardly projecting position the burner will be again lowered and raised so as to cut the second half of the hole in the pipe on the opposite side of its longitudinal center and thereby complete the formation of the hole.

This operation of twice raising and lowering the cutting torch during each bodily rotation of the latter is effected by adjusting the speed changing mechanism which controls the raising and lowering of the burner so as to engage the large sliding gear 116 with the small driven gear 113 on the crank shaft 72, as shown in Fig. 1.

When a hole 128 is to be cut into the side of a pipe the center of which is tangential relative to the periphery thereof and this entire opening is on one side of the longitudinal center line of the pipe, as shown in Fig. 10, then the tip of the burner is only required to effect one complete reciprocation toward and from the pipe during each complete bodily rotation about the axis of the turret in order to complete the formation of this circular hole. When cutting such an opening the cutting operation of the burner starts to move when the same is immediately above the highest part of the pipe, as shown in Fig. 10, then moves downwardly and rotates a half circle and then moves upwardly another half circle during its continued bodily rotary movement until it again reaches the uppermost part of the pipe at which point the operation of cutting the hole is completed.

In order to cause the burner to only effect one downward stroke and one upward stroke while the same is making one complete bodily rotation about its axis the speed changing device is adjusted so as to disengage the large gear 116 on the countershaft from the small gear 113 on the crank shaft and instead engage the smaller sliding gear 115 on the clutch sleeve with the correspondingly sized gear wheel 112 on the crank shaft so that these two shafts rotate at the same speed.

By adjusting the wrist pin 77 radially on the crank arm 73 so as to vary the effective throw of this crank it is possible to change the length of the stroke of the burner toward and from the workpiece or pipe which is being cut in accordance with different requirements, such as cutting holes of different diameters in pipes or in workpieces in which the surfaces are uneven.

By rotating the gas intake pipe 52 of the burner in the sleeve 98 and also by turning one body section of the swivel coupling vertically relatively to the other, the angle at which the gas flame is directed from the burner toward the workpiece can be adjusted so that the edge of the hole which is cut in the pipe is either straight or parallel with a radial line from the axis of the pipe, or this edge may be beveled so that it is tangential relative to the axis of the pipe, thereby enabling this apparatus to form the edge of this opening to suit the requirements for securing this pipe to another pipe with which it is to be connected by welding or otherwise.

As a whole this machine is comparatively simple in construction, considering the character of the work which it performs, the same can be very readily set up for cutting holes of different diameters and in different locations in pipes and the same also permits of performing the cutting operation quickly and easily so that work of this character can be done economically and expeditiously.

I claim as my invention:

1. A machine for cutting pipes and similar articles, comprising a frame, a tubular shaft mounted on said frame so as to be capable of rotation but incapable of axial movement thereon, a turret having a sleeve surrounding said shaft and compelled to turn therewith but capable of moving axially thereon, a shifting rod arranged within the tubular shaft and capable of moving axially therein but incapable of turning therewith, and a tool for cutting an article mounted on said turret on one side of its axis of rotation and movable relative to said article both around the axis of said shaft and also lengthwise of said axis.

2. A machine for cutting pipes and similar articles, comprising a frame, a tubular shaft mounted on said frame so as to be capable of rotation but incapable of axial movement, a turret having a sleeve surrounding said shaft and compelled to turn therewith but capable of moving axially thereon, a shifting rod arranged within the tubular shaft and capable of moving axially therein but incapable of turning therewith, a tool for cutting an article mounted on said turret on one side of its axis of rotation and movable relative to said article both around the axis of said shaft and also lengthwise of said axis, and means reciprocating said shifting rod including a shaft provided with a crank, and a link connecting said crank with said shifting rod.

3. A machine for cutting pipes and similar articles, comprising a frame, a tubular shaft mounted on said frame so as to be capable of rotation but incapable of axial movement, a turret having a sleeve surrounding said shaft and compelled to turn therewith but capable of moving axially thereon, a shifting rod arranged within the tubular shaft and capable of moving axially therein but incapable of turning therewith, a tool for cutting an article mounted on said turret on one side of its axis of rotation and movable relative to said article both around the axis of said shaft and also lengthwise of said axis, means for rotating said shaft including a motor operatively connected with said shaft, means for reciprocating said shifting rod including a rotatable crank operatively connected with said shifting rod, and means for varying the relative speed of said shaft and crank including a speed changing device operatively connected with said motor and said crank.

4. A machine for cutting pipes and similar articles, comprising a cutting tool, a frame, a tubular shaft journaled on said frame so that it can turn therein but not move axially relatively thereto, a turret supporting said cutting tool and compelled to turn with said shaft but movable axially thereon by means including a sleeve forming a part of the turret and surrounding said shaft and a spline interposed between said shaft and sleeve; and means for reciprocating said turret lengthwise of the shaft including a shifting rod arranged in the shaft and provided with a collar having an annular groove, and pins arranged on the turret and engaging with said groove, a shaft journaled on the frame and having a crank, and a connecting rod connecting said crank and shifting rod.

5. A machine for cutting pipes and like articles, comprising a main frame, an upright tubular driven shaft journaled on said frame, a turret adapted to support a cutting tool and rotatable about the axis of said shaft and also movable lengthwise thereof and including a sleeve surrounding the shaft and splined thereto and a head connected with the lower end of the sleeve, a shifting rod arranged within said shaft and connected with the turret by means including a collar arranged on the shifting rod and provided with an annular groove, and pins arranged on the sleeve and engaging said groove, and means for reciprocating the shifting rod including a driving shaft having a crank and a link connecting said crank with said shifting rod.

HERMAN HATTEN.

REFERENCES CITED

The following references are of record in the file of this patent:

UNITED STATES PATENTS

| Number | Name | Date |
|---|---|---|
| 866,866 | Jottrand | Sept. 24, 1907 |
| 1,907,956 | Gerber | May 9, 1933 |
| 1,923,778 | Douglass | Aug. 22, 1933 |
| 2,295,182 | Norton | Sept. 8, 1942 |

FOREIGN PATENTS

| Number | Country | Date |
|---|---|---|
| 474,315 | Germany | Mar. 30, 1929 |